United States Patent
Winkler

(10) Patent No.: US 6,900,554 B1
(45) Date of Patent: May 31, 2005

(54) CIRCUIT CONFIGURATION FOR CONTROL OF THE CURRENT CONSUMPTION OF ONE OR MORE HEAVY CURRENT CONSUMPTION DEVICES IN A MOTOR VEHICLE

(75) Inventor: Josef Winkler, Kipfenberg (DE)

(73) Assignee: Audi AG (DE)

( * ) Notice: Subject to any disclaimer, the term of this patent is extended or adjusted under 35 U.S.C. 154(b) by 88 days.

(21) Appl. No.: 08/849,873

(22) PCT Filed: Nov. 23, 1995

(86) PCT No.: PCT/EP95/04615
§ 371 (c)(1),
(2), (4) Date: Sep. 17, 1997

(87) PCT Pub. No.: WO96/19362
PCT Pub. Date: Jun. 27, 1996

(30) Foreign Application Priority Data

Dec. 21, 1994 (DE) .......... 44 45 647

(51) Int. Cl.$^7$ ................ B60L 1/00
(52) U.S. Cl. ............... 307/10.1; 320/145
(58) Field of Search .......... 307/9.1, 10.1, 307/10.7; 322/62–64; 320/21, 145; 323/282, 283, 284, 285, 299, 303; 310/68 R, 68 C, 68 D

(56) References Cited

U.S. PATENT DOCUMENTS

| 4,459,537 A | * | 7/1984 | McWhorter ............. 323/303 |
| 4,827,393 A | * | 5/1989 | Clark ................. 322/28 |
| 5,177,677 A | * | 1/1993 | Nakata et al. .......... 320/21 |
| 5,291,388 A | * | 3/1994 | Heinrich ............... 320/57 |
| 5,606,244 A | * | 2/1997 | Migdal ................ 307/16 |
| 5,717,256 A | * | 2/1998 | Okumura et al. ......... 307/66 |
| 5,719,484 A | * | 2/1998 | Taniguchi et al. ....... 322/20 |
| 5,808,448 A | * | 9/1998 | Naito .................. 322/28 |

FOREIGN PATENT DOCUMENTS

| DE | 3007941 | 9/1981 |
| DE | 3509073 | 9/1985 |
| DE | 3936638 | 11/1989 |
| DE | 4223854 | 1/1993 |
| DE | 4320509 | 6/1993 |
| EP | 0593299 | 4/1994 |

* cited by examiner

Primary Examiner—Josie Ballato
Assistant Examiner—Rios Roberto
(74) Attorney, Agent, or Firm—Stevens, Davis, Miller & Mosher, LLP

(57) ABSTRACT

In order to prevent discharge of the battery (3) of a motor vehicle during operation of heavy current consumption devices, a circuit configuration is to be prepared which comprises essentially a rotary current generator (1), a vehicle battery (3), one or more current consuming devices (4), and a controllable voltage converter (2). The voltage converter (2) supplies an output voltage which varies as a function of the control signal of a control unit (10) of the current generator (1) and which supplies the current consuming device (4). In the event of overloading of the rotary current generator (1) the output voltage of the voltage converter (2) is lowered in order to reduce the current consumption of the device (4) and prevent overloading of the rotary current generator (1) and discharge of the vehicle battery (3).

11 Claims, 3 Drawing Sheets

Figure 1:
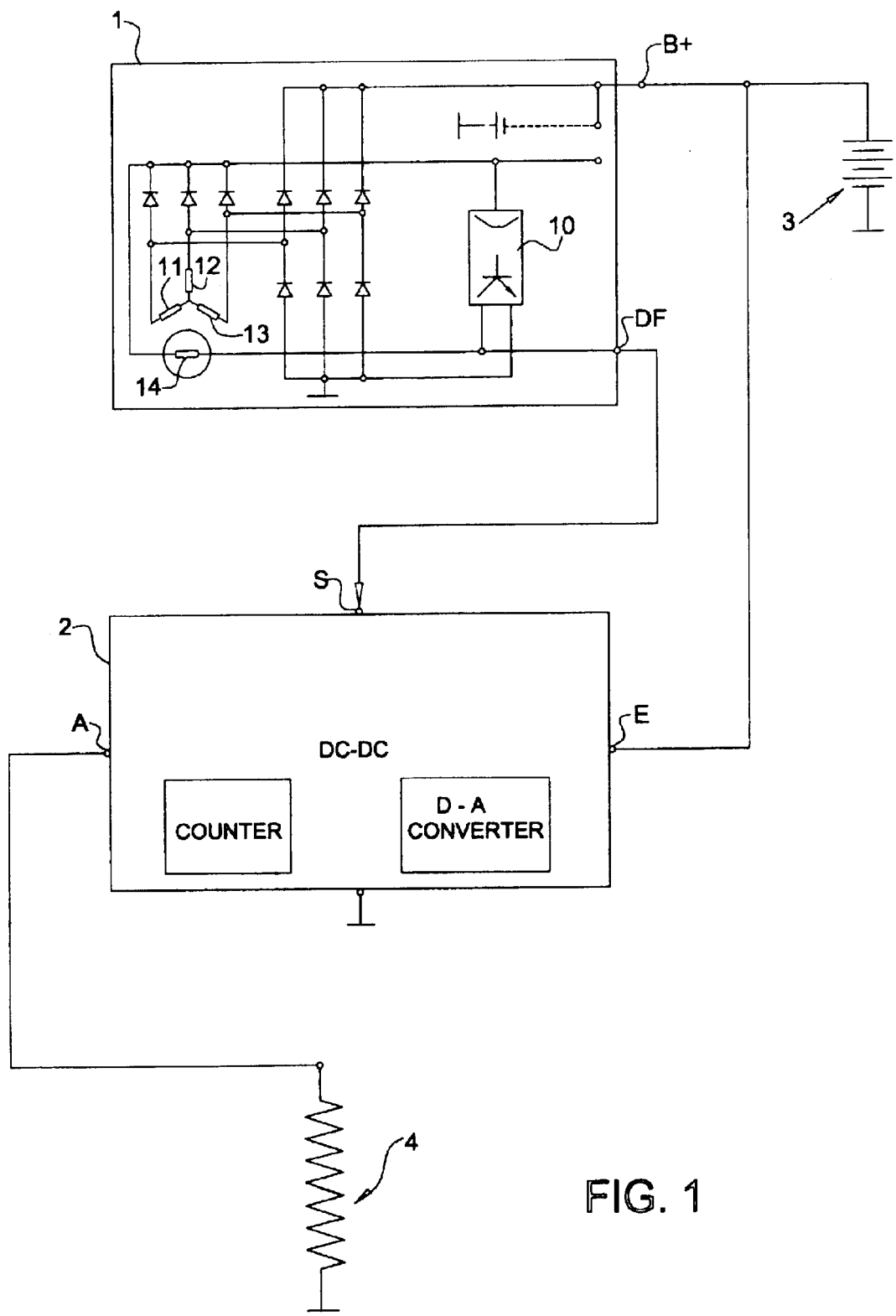

CIRCUIT CONFIGURATION FOR CONTROL OF THE CURRENT CONSUMPTION OF ONE OR MORE HEAVY CURRENT CONSUMPTION DEVICES IN A MOTOR VEHICLE

The present invention relates to a circuit configuration for control of the current consumption of several consumption devices in a motor vehicle equipped with a rotary current generator, with a control unit for control of the generator output voltage, and a vehicle battery that can be charged by means of the generator. The invention also relates to a process for control of the current consumption of several power consumption devices in a motor vehicle.

If several current consumption devices are switched on simultaneously in a motor vehicle, the output current supplied by the generator often is not enough to provide for the current consumption of all the power consumption devices in the vehicle. Such is the case in particular if the power consumption devices include heavy current consuming heating devices. If the current supplied by the generator under full load is not sufficient in a case such as this, the consumption devices draw additional current from the battery of the vehicle, this resulting in discharge of the battery after a certain time interval.

In order to prevent discharging of the vehicle battery, a transition has been made to heaters with heating elements which can be engaged individually. One such electric heater, for example, in which the heater elements are switched on individually is described in DE 35 09 073 A1. The individual heating resistances are switched on or off one by one, as a function of whether the generator is or is not delivering excess output.

Circuit designs are also known which make certain that individual consuming devices of a group of several power consuming devices in a motor vehicle are switched off when the generator is overloaded.

The object of this invention is to develop a circuit configuration for control of power consumption by power consuming devices in a motor vehicle such that discharge of the vehicle's battery is prevented even during operation of heavy power consuming devices.

This goal is reached by means of a circuit configuration in a motor vehicle with a rotary current generator having a control unit for control of the output voltage of the generator and with an output terminal, in that there is provided in the circuit configuration for control of the current consumption of one or more current-consuming devices a controllable voltage converter which is inserted between the generator and the current-consuming devices. The voltage converter is controlled by means of a control unit signal delivered by the control unit of the generator and delivers to the current-consuming device connected to the output of the voltage converter a voltage which varies as a function of this control unit signal.

This circuit configuration described in claim 1 permits execution of the process indicated in claim 8 for control of the current consumption of one or more current-consuming devices installed in a motor vehicle. It is claimed for the invention that the output voltage of the voltage converter is controlled in such a way that the output voltage of the voltage converter is always decreased if the width of the pulse of the control unit signal applied to the output connection of the control unit falls below a minimum value w, and the output voltage of the voltage converter always increases if the width of the pulse of the control unit signal applied to the output connection of the control unit exceeds a maximum value W.

Advantageous embodiments of the circuit configuration described in Claim 1 are indicated in subsidiary claims 2–7.

One advantage of this invention is that the control unit signal applied to the control unit output and to one end of the excitation coil may be used as a control signal. Specifically, the control unit continuously scans the output voltage of the generator and always interrupts the excitation current if the output voltage of the generator exceeds a maximum value. Consequently, the voltage at the output of the control unit ranges from a high voltage level to a low voltage level. A high voltage level is always applied if the excitation circuit of the generator is interrupted. A large bandwidth denotes that the generator has not been charged to capacity, while a small bandwidth signifies that the generator has been charged to capacity or is overloaded. A low voltage level is then always applied to the control unit output connection if an excitation current is flowing through the excitation coil.

It is advantageous for this control unit signal with a voltage pulse of variable width to be delivered to a direct-current to direct-current converter (hereafter referred to as a DC-DC converter) by way of the control input of the latter so that an output voltage determined as a function of the pulse width of the voltage pulses of the control unit signal is obtained at the output of the DC-DC-converter.

As is indicated in Claim 4, a DC-DC-converter such as this may be constructed simply with a counter and a digital-to-analog converter (hereafter referred to as a "DA converter." The counter may be used to determine the pulse width or pulse duration of the control signal, which value may be obtained in the form of a digital value (counter reading). This digital value can be converted by the DA converter to an output voltage proportional to the counter reading.

In place of the DC-DC converter use may also be made of a converter (hereafter referred to as an AC-AC converter) which converts the alternating voltages supplied directly by the stator coils of the generator to an output alternating voltage which is proportional to the pulse width of the control signal applied to the output of the control unit. An AC-AC converter may always be used if a consuming device powered by alternating voltage or if a consuming device supplied with series-connected rectified voltage is present in the motor vehicle.

As is indicated in Claim 6, the AC-AC converter can be constructed by simple means with a thyristor unit in which the control signal is delivered to the control connections of the thyristors. A transformer may, if necessary, also be inserted downstream from the thyristor unit. Since the control signal is delivered to the control connections of the thyristors, an output alternating voltage dependent on this control pulse is obtained at the output of the AC-AC converter.

What is probably to be regarded as the most significant advantage of the circuit configuration claimed for the invention is that, as result of the control claimed for the invention of current consumption of consuming devices, even low-output generators may be used in vehicles without causing discharge of a vehicle's battery.

Figure 2:
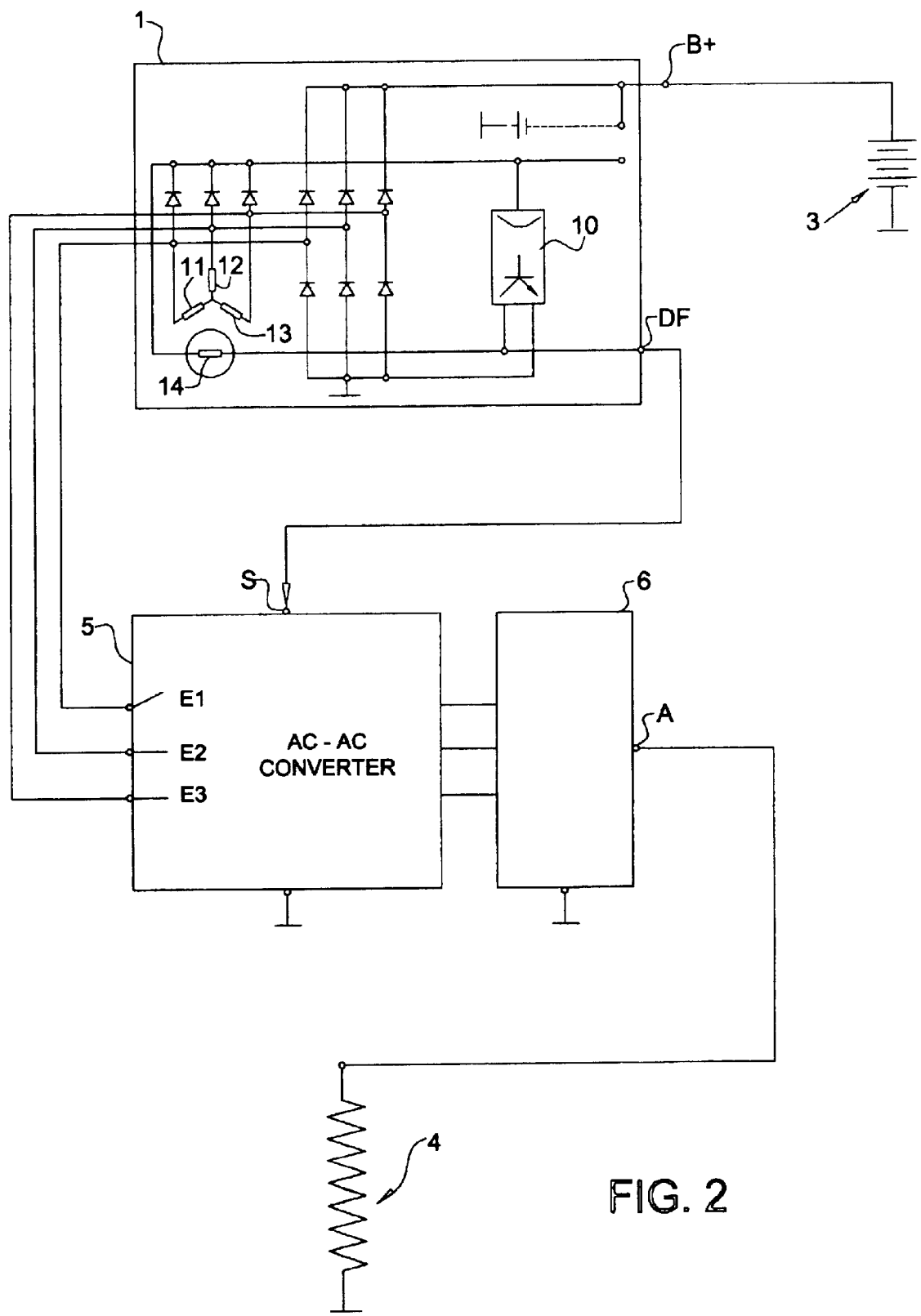
Figure 3:
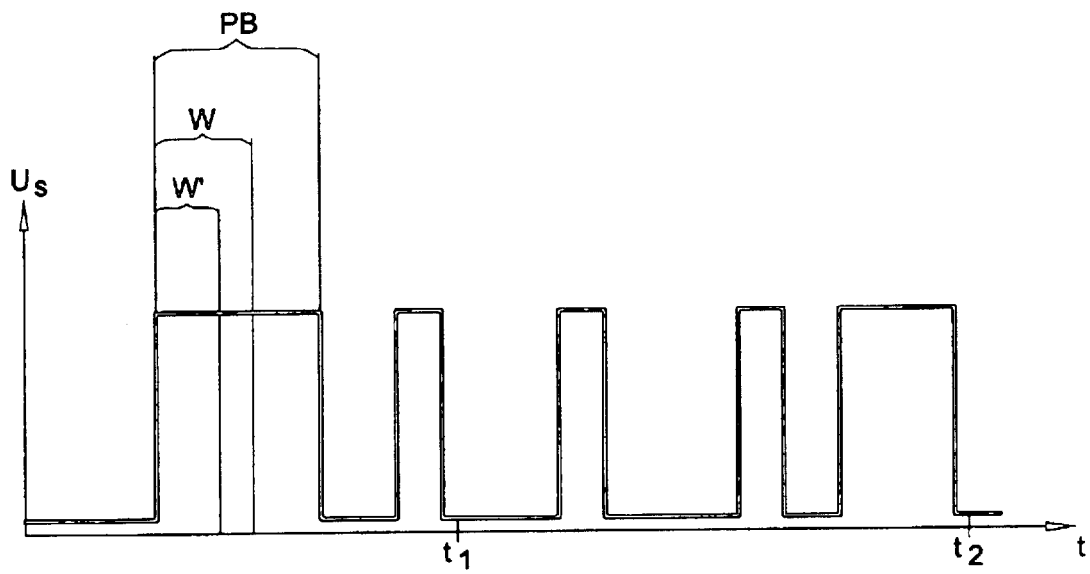
Figure 4A:
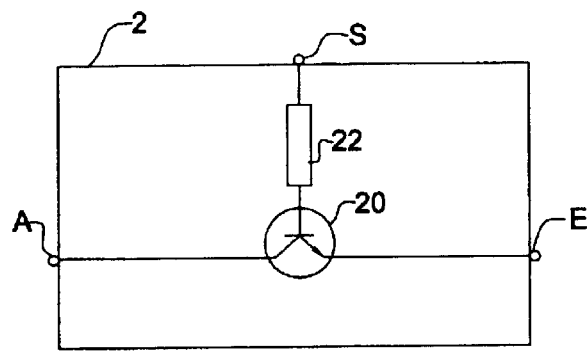

Two embodiments are described in what follows with reference to the attached drawings. In these drawings, FIG. 1 shows a first embodiment of the circuit configuration claimed for the invention, one in which the voltage converter is a DC-DC converter;

FIG. 2 a second embodiment of the circuit configuration claimed for the invention, one in which the voltage converter is an AC-AC converter;

FIG. 3 the pattern of the control signal voltage over time;

FIG. 4a a potential alternative design of the voltage converter; and

Figure 4B:
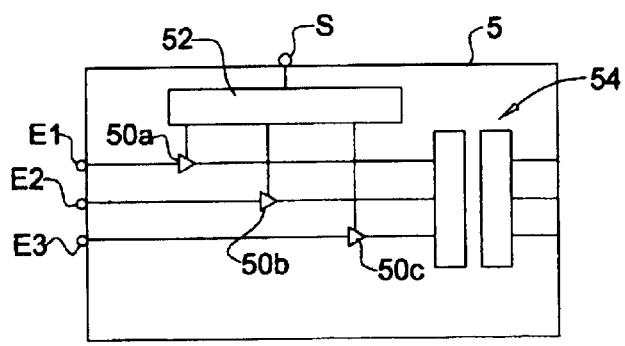

FIG. 4b another potential alternative design of the voltage converter.

The circuit configuration shown in FIG. 1 comprises a rotary current generator, a voltage converter 2, a vehicle battery 3, and a current consuming device 4.

The rotary current generator includes three stator coils 11, 12, and 13 mounted on a stator not shown and a field coil 14 mounted on the rotor not shown of the generator 1. Also mounted in the generator is a control unit 10 which controls the generator output voltage applied to a terminal B+. The control unit scans the alternating voltages induced in the stator coils 11, 12, 13 and always interrupts the excitation current circuit if the alternating voltages exceed a maximum value in the stator coils. The field coil 14 is grounded only if the transistor of the control output stage conducts current. The collector of the control output stage transistor is connected to a DF terminal hereafter designated as the output terminal of the control unit.

There is applied to the DF output terminal of the control unit a square-pulse voltage whose pattern over time is illustrated in FIG. 3. As is to be seen from FIG. 3, the pulse width of the square-voltage pulse at the DF output terminal varies over time. When the generator charge is low, the pulse width of the voltage at terminal DF is large, since the excitation current circuit is interrupted for a longer period and accordingly a high voltage level is applied to terminal DF. On the other hand, if the generator is fully charged or even overcharged, the pulses of the voltage at connecting terminal DF are narrow, since the excitation current circuit of the generator is mostly closed. When the circuit is closed, the transistor in the output stage of the control unit is conductive, this resulting in a drop in the voltage at the output terminal DF to ground potential.

The control unit output voltage of the control unit 10 at the output terminal DF functions as a control signal and is delivered to the voltage converter 2. The voltage converter 2 is a DC-DC converter with a control connection S, an input connection E, and an output connection A which is connected to the consuming device 4. The DC-DC converter 2 is controlled in such a way that the output voltage Ua at the output connection A is equal to (or greater than) the input voltage Ue at the input connection E, if the pulse width of the control signal at the control connection is large, and so that the output voltage Ua is smaller than the input voltage Ue if the pulse width of the control signal falls below a minimum value w. The following relationships accordingly obtain:

$$Ua\ (PB)=f\ (PB)$$

Ua<Ue if PB<w
Ua=Ue or Ua>Ue if PB>W

A DC-DC converter 2 which operates as described above may be made up, for example, of a counter and an DA converter whose analog output signal controls the output stage of the DC-DC converter 2. If the digital value corresponding to the counter reading is high, an analog signal of high voltage level is applied to the output of the DA converter, so that the output voltage in the output stage of the DC-DC converter 2 is high. In the inverse case, that is, if a control unit signal of small pulse width is present, the output voltage in the output stage of the DC-DC converter is lowered.

FIG. 4a illustrates another alternative design of the DC-DC converter 2. The DC-DC converter shown in the figure consists essentially of a transistor 20, which may be a bipolar transistor or a field effect transistor, and a base resistance 22. This converter converts a constant direct voltage to a timed direct voltage if the transistor 20 is activated by the square-pulse signal of the control unit 10.

The second embodiment of the invention is described in what follows. Circuit elements in the circuit configuration shown in FIG. 2 are identified by symbols the same as those of the circuit elements of the circuit configuration shown in FIG. 1. The circuit configuration in FIG. 2 differs from the circuit configuration in FIG. 1 in essence only in that in FIG. 2 the voltage converter provided is an AC-AC converter 5 with three input connections, E1, E2, and E3 and in that a rectifier circuit 6 is inserted upstream from the current consuming device 4. The alternating voltages induced in stator coils 11, 12, and 13 are applied to inputs E1, E2, and E3 of the AC-AC converter 5. As is to be seen from FIG. 4b, the voltage converter may contain a thyristor unit with several thyristors 50a, 50b, and 50c. The thyristors function as alternating current converters which convert the alternating currents applied to inputs E1, E2, and E3 of an assigned voltage to one or more alternating currents of lower voltage. The AC-AC converter 5 contains a circuit 52, which is provided to convert the control unit signal at the control input S of the converter 5 used as a control signal to signals suitable for activation of the thyristors. Provision of an alternating current transformer 54 at the output of the AC-AC converter is also conceivable.

The output voltage Uw of the AC-AC converter may be controlled as is the output voltage of the DC-DC converter by activating the thyristors 50a, 50b, and 50c with the output signal of the control unit 10. The relationships presented above in connection with the description of the circuit configuration shown in FIG. 1 also apply to the output voltage of the AC-AC converter 5.

The DC-DC converter and AC-AC converter may, of course, be made up of other circuit components. The circuit design of the DC-DC converter and AC-AC converter proposed here represents only one possible alternative design of a multiplicity of alternate designs.

Lastly, the process for control of current consumption of current consuming devices installed in a motor vehicle is now explained with reference to FIG. 3. The pattern over time of a potential control unit signal applied to the control connection S of the voltage converter 2 or 5 is illustrated in FIG. 3. As has already been pointed out, the pulse width PB is a gauge of the charging status of the rotary current generator 1. Large pulse widths PB indicate a low generator charging level and small pulse widths PB a high charging level or overcharging of the generator 1. If the pulse width of the square pulse of the control voltage falls below minimum w, as is the case at time $t_1$, for example, the output voltage of the voltage converter 2 or 5 is lowered in order to reduce the current consumption of the consuming device 4 connected to the voltage converter. This in turn has the result that the width of the square pulse of the control voltage increases. As may be seen from FIG. 3, the pulse width PB is significantly greater at a later time $t_2$ than it was at earlier time $t_1$.

At time $t_2$, for example, the pulse width is above a maximum value W. If the pulse width PB is above a maximum value W, the output voltage of the voltage converter 2 or 5 is increased. Raising and lowering the output voltage ensure that the maximum consumption of a current consuming device will be limited and that generator overloading will not occur.

What is claimed is:

1. A process for controlling a current consumption of a current consumption device in a motor vehicle, which process is carried out by a circuit configuration comprising one of a DC-DC converter and an AC-AC converter having an output voltage being connected between a rotary current generator having a control unit with a control unit signal and said current consumption device;

said one of a DC-DC converter and an AC-AC converter having a control connection for reception of the control unit signal with a pulse width and an output connection for delivering the output voltage to said one or more current consumption devices, wherein the output voltage is lowered if the pulse width falls below a predetermined minimum value, and the output voltage is increased if the pulse width exceeds a predetermined maximum value.

2. A method of controlling a current consumption device connected to an output voltage of a converter controlled by a signal width a pulse width, wherein the output voltage decreases when the pulse width falls below a predetermined value; and the output voltage increases when the pulse width exceeds said predetermined value.

3. A circuit configuration in a motor vehicle, comprising:
a rotary current generator;
a control unit with an output terminal being mounted in the rotary current generator for controlling a generator output voltage; and
a vehicle battery chargeable by the generator for controlling a current consumption of a current consumption device;
wherein said circuit configuration comprises a DC-DC converter connected between said rotary current generator and said current consumption device, said DC-DC converter comprises a control connection for reception of a control signal from the output terminal of said control unit and an output connection delivering an output voltage to said current consumption device, said control signal is a rectangular signal of variable pulse width, and said DC-DC converter includes a counter for recording said variable pulse width and a digital to analog converter whose output voltage is proportional to a digital value displayed by the counter.

4. A circuit configuration in a motor vehicle, comprising:
a rotary current generator;
a control unit with an output terminal being mounted in the rotary current generator for controlling a generator output voltage; and
a vehicle battery chargeable by the generator for controlling a current consumption of a current consumption device;
wherein said current configuration comprises an AC-AC converter connected between said rotary current generator and said current consumption device, said AC-AC converter comprises a control connection for reception of a control signal from the output terminal of said control unit and an output connection delivering an output voltage to said current consumption device, said control signal is a rectangular signal of variable pulse width, the inputs of said AC-AC converter are supplied with AC voltages from a plurality of stater coils of the rotary current generator and the generator supplies an output voltage varying as a function of the pulse width of the rectangular pulses of the control unit.

5. A circuit configuration in a motor vehicle, comprising:
a rotary current generator;
a control unit with an output terminal being mounted in the rotary current generator for controlling a generator output voltage; and
a vehicle battery chargeable by the generator for controlling a current consumption of a current consumption device;
wherein said current configuration comprises an AC-AC converter connected between said rotary current generator and said current consumption device, said AC-AC converter comprises a control connection for reception of a control signal from the output terminal of said control unit and an output connection delivering an output voltage to said current consumption device, and said AC-AC converter includes a plurality of thyristers controlled by said control unit signal.

6. A circuit according to claim 4 wherein the output connections of the AC-AC converter are connected to the inputs of a rectifier circuit inserted upstream from the current consumption device.

7. An apparatus comprising:
a generator having a control unit with a control signal;
a DC-DC converter; and
a current consuming device;
wherein said DC-DC converter upon receipt of the control signal and a first energy source from the generator, delivers a second energy source to the current consuming device, said control signal comprises a square wave of variable pulse width and said DC-DC converter includes a counter to record the variable pulse width of said control signal.

8. An apparatus comprising:
a generator having a control unit with a control signal;
a DC-DC converter; and
a current consuming device;
wherein said DC-DC converter upon receipt of the control signal and a first energy source from the generator, delivers a second energy source to the current consuming device, said control signal comprises a square wave of variable pulse width and the DC-DC converter comprises a digital to analog converter to convert the second energy source from a digital form to an analog form.

9. An apparatus comprising:
a generator having a control unit with a control signal;
an AC-AC converter; and
a current consuming device;
wherein said AC-AC converter upon receipt of the control signal and a first energy source from the generator, delivers a second energy source to the current consuming device, said control signal is a square wave of variable pulse width and said AC-AC converter comprises a control connection to receive the control signal, a plurality of three phase connections to receive the first energy source and a plurality of three phase connections to deliver the second energy source.

10. An apparatus comprising:
a generator having a control unit with a control signal;
an AC-AC converter; and
a current consuming device;
wherein said AC-AC converter upon receipt of the control signal and a first energy source from the generator, delivers a second energy source to the current consuming device, said control signal is a square wave of variable pulse width and said AC-AC converter comprises a plurality of thyristers each controlled by said control signal.

11. An apparatus according to claim 9 wherein a rectifier circuit is connected between the plurality of three phase connections delivering the second energy source and the current consuming device.

* * * * *